United States Patent Office 2,706,176
Patented Apr. 12, 1955

2,706,176

CUTTING OIL DERIVED FROM OXIDIZED PETROLEUM OIL

David Frazier, South Euclid, Ohio, assignor to The Standard Oil Company, Cleveland, Ohio, a corporation of Ohio No Drawing. Application October 17, 1951, Serial No. 251,820

13 Claims. (Cl. 252—33.6)

The present invention relates to a neutralized product of a reaction between oxidized oil and sulfur chloride that is useful as a cutting oil.

It is known generally that many cutting oils now on the market contain sulfur in dissolved or combined form and that in some instances such cutting oils are prepared by reacting a vegetable or mineral oil with sulfur chloride. Thus, for example, it is known to react lard oil, phenols, sperm oil, alcohol esters, mercaptans, hydrogenated esters, olefins, isobutylene polymers, and the like with sulfur chloride usually under conditions of elevated temperature and pressure to produce an oil suitable in metal cutting operations.

The primary object of the present invention is to provide a cutting oil capable of providing the lubricity required to achieve a smooth surface finish and which is stable from the standpoint of maintaining its sulfur content in such a state of solution or chemical combination as to avoid the precipitation of sulfur on standing.

It has been found that an excellent cutting oil can be obtained by reacting sulfur chloride, i. e., sulfur monochloride or sulfur dichloride, with a highly refined, oxidized, solvent-extracted mineral oil initially having a viscosity ranging between 75 and 600 SSU at 100° F., preferably between 75 and 150 SSU at 100° F., having an ASTM aniline point of over 105° C., an aromatic content of below 12%, oxidized to a saponification number between about 20 and 80, preferably between 55 and 80, and a neutralization number between about 12 and 25 and then neutralizing the reaction product. The oxidation of the solvent-extracted oil may be carried out in a manner well known to the art, e. g., by passing air through the oil for several hours in the presence of a catalyst such as manganese naphthenate or manganese stearate while maintaining the oil at an elevated temperature of the order of 200 to 350° F. Following the neutralization the oil dissolves readily in all proportions with a cutting oil base such as straw paraffin oil having a viscosity between 75 and 150 SSU at 100° F.

The cutting oil of the present invention has been found to compare favorably with one of the best cutting oils now on the market. One of the primary advantages of the oil of this invention is that it is not dependent upon a source of vegetable oil such as lard oil or similar products that would become scarce in war time.

The reaction of the oxidized oil with sulfur chloride is exothermic and results in an evolution of hydrogen chloride. In the preferred embodiment of the invention the reactants are mixed while stirring and the stirring is continued until the evolution of hydrogen chloride has ceased. The mixture is then allowed to stand for a considerable length of time, say one to three days, to insure completion of the reaction. The reaction mixture is then blown with a moderate stream of air or the like to sweep out volatile acids and a small amount of sludge in the bottom of the reaction flask is removed from the reaction product which at this point in the process is not miscible with ordinary mineral oil bases and is extremely corrosive.

The proportion of sulfur monochloride to oxidized oil may vary widely within a range up to about 20% by weight of the oxidized oil (i. e., about 9.5 parts by weight sulfur to 100 parts by weight oxidized oil), depending upon the cutting ability desired in the final product. When more than about 20% sulfur monochloride is used, the subsequently neutralized product becomes insoluble in oil. Because of the lower sulfur content in sulfur dichloride, the amount of sulfur dichloride may be correspondingly higher, i. e., up to about 30%. There is no lower limit to the amount of sulfur chloride to be reacted with the oxidized oil because any amount, no matter how small, will improve its cutting ability.

The neutralization may be carried out with suitable neutralizing agents such as lime or sodium, potassium or nitrogen bases. Lime is preferred because it has superior effectiveness in rendering the reaction product oil soluble. Sodium, potassium and nitrogen bases are adequate for neutralizing the reaction product but are not as effective as lime because they have a greater tendency to make the product water soluble rather than oil soluble.

The amount of neutralizing agent used may also vary widely depending upon the oil solubility desired. In practice, larger or smaller amounts of neutralization agent may be used depending upon the limits of oil solubility desired in the product. Ordinarily, if the sulfurized oxidized reaction product is to be used in a concentration of say up to about 25% in a mineral cutting oil, it is sufficient to neutralize the reaction product with approximately one part by weight of lime to 100 parts by weight of reaction product. Since excess neutralizing agent does not react and can be separated simply by decantation, it is usually desirable to use an excess thereof and recover the unused portion.

If desired, elemental sulfur may be added before, during or after the neutralization. Tests have shown that the reaction product has a comparatively high solubility for sulfur.

The invention will be illustrated in greater detail by the following example, it being understood that the invention is not to be limited to the specific example included in the present application.

EXAMPLE

66.8 grams of sulfur monochloride were added, with stirring, to 400 grams of solvent-extracted mineral oil having a viscosity of 115 SSU at 100° F. and an aniline point of 105° C. oxidized to a saponification number of 58 and a neutralization number of 18. After the exothermic reaction and evolution of hydrogen chloride had ceased, stirring was stopped and the contents of the reaction flask were allowed to stand for 48 hours to complete the reaction. The mixture was then blown with a moderate stream of air for 18 hours to sweep out the volatile acids. A small amount of sludge was found in the bottom of the reaction flask. The product was not miscible with ordinary mineral cutting oil bases.

The reaction product was divided into four 100 gram samples. To each sample there were added 4 grams of commercial slaked lime (Ca(OH)$_2$) and 0, 1, 5 and 10 grams, respectively, of free sulfur. The four samples were then heated at 100° C. for one-half hour and blown briefly with air to eliminate traces of water. The samples were then added to straw paraffin oil having a viscosity of 100 SSU at 100° F. in proportions of one part by weight sample to four parts by weight oil to make up 20% oil solutions. All the solutions were clear and none precipitated sulfur upon standing one week. The results are listed in Table I below:

*Table I*

| Solution of Sample | Added to Reaction Product | | Analyses of 20% Solutions | | |
|---|---|---|---|---|---|
| | Free Sulfur, g. | Lime, g. | Percent Total S | Percent Free S | Percent Ash |
| 1 | 0.0 | 4.0 | 1.64 | 0.63 | 1.32 |
| 2 | 1.0 | 4.0 | 1.88 | 0.86 | 1.36 |
| 3 | 5.0 | 4.0 | 2.3 | 1.36 | 1.22 |
| 4 | 10.0 | 4.0 | 2.86 | 1.74 | 1.18 |

The 20% solutions of Samples 1 and 4 and one of the most successful commercial cutting oils now on the market were subjected to evaluation tests on a lathe. The commerial oil, referred to as such in Table II, is a sulfurized mineral oil containing about 2½% total sulfur and 4% lard oil. In one test a piece of 1015 steel was machined to a smooth finish with the oil to be tested. The roughness of each surface, defined as the average root mean square of the depth of the pits is determined for each finish. The value obtained with the commercial oil is used as the standard and the roughness of any surface obtained by using a different cutting oil divided by the roughness of the surface obtained with the commercial oil gives an indication of the relative suitability of the new cutting oil. With the index for the commercial oil set as 1.00, a finish index below 1.00 would indicate a smoother surface and hence a more desirable cutting oil. Another test is utilized to indicate the loss in weight of a cutting tool used to finish a given piece of steel. In this test the loss in weight resulting from the use of commercial oil is used as the standard and given a wear index value of 1.00 and the average wear index of new oils is computed in the same manner as outlined with reference to the finish index, an index below 1.00 again indicating a smaller loss in weight of tool and therefore a more desirable cutting oil.

Finish index tests were carried out on 1015 steel and wear index tests were carried out on 1015 and 1841 steel. The results are tabulated in Table II below:

*Table II*

LATHE EVALUATION OF CUTTING FLUIDS

| Steel | Average Finish Index | Average Wear Index | |
|---|---|---|---|
| | 1015 | 1015 | 1841 |
| Commercial Oil | 1.00 | 1.00 | 1.00 |
| 20% Solution of Sample 1 | 0.98 | 0.93 | 0.79 |
| 20% Solution of Sample 4 | 0.62 | 0.74 | 0.99 |

The results of these tests show that the cutting oil of the present invention compares favorably with, and is in fact somewhat superior to, the commercial oil used as a standard.

It is anticipated that various changes and modifications will readily occur to those skilled in the art upon reading the description of this invention. All such changes and modifications are intended to be included within the scope of this invention as defined in the appended claims.

I claim:

1. A method which comprises reacting, by admixing while stirring, sulfur chloride and a highly refined solvent-extracted mineral oil having an initial viscosity between 75 and 600 SSU at 100° F., an ASTM aniline point of over 105° C., and an aromatic content of below 12%, said solvent-extracted mineral oil having been oxidized, prior to admixture with sulfur chloride, to a saponification number between about 20 and 80 and to a neutralization number between about 12 and 25, and adding a neutralizing agent to neutralize the reaction product so produced, the proportion of sulfur chloride admixed with the oxidized oil being appreciable but insufficient to add more than about 9.5 parts by weight sulfur to 100 parts by weight oxidized oil.

2. A method which comprises reacting, by admixing while stirring, sulfur chloride and a highly refined solvent-extracted mineral oil having an initial viscosity between 75 and 600 SSU at 100° F., an ASTM aniline point of over 105° C., and an aromatic content of below 12%, said solvent-extracted mineral oil having been oxidized, prior to admixture with sulfur chloride, to a saponification number between about 55 and 80 and to a neutralization number between about 12 and 25, and adding a neutralizing agent to neutralize the reaction product so produced, the proportion of sulfur chloride admixed with the oxidized oil being appreciable but insufficient to add more than about 9.5 parts by weight sulfur to 100 parts by weight oxidized oil.

3. A method which comprises reacting, by admixing while stirring, from an appreciable amount up to about 20% by weight sulfur monochloride with a highly refined solvent-extracted mineral oil having an initial viscosity of about 115 SSU at 100° F., an ASTM aniline point of over 105° C., and an aromatic content of below 12%, said solvent-extracted mineral oil having been oxidized, prior to admixture with sulfur monochloride, to a saponification number of about 58 and a neutralization number of 18, and adding an excess of lime to neutralize the reaction product so produced.

4. A method which comprises reacting, by admixing while stirring, sulfur chloride and a highly refined solvent-extracted mineral oil having an initial viscosity between 75 and 600 SSU at 100° F., an ASTM aniline point of over 105° C., and an aromatic content of below 12%, said solvent-extracted mineral oil having been oxidized, prior to admixing with sulfur chloride, to a saponification number between about 20 and 80 and a neutralization number between about 12 and 25, and adding a neutralizing agent and elemental sulfur to neutralize and dissolve additional sulfur in the reaction product so produced, the proportion of sulfur chloride admixed with the oxidized oil being appreciable but insufficient to add more than about 9.5 parts by weight sulfur to 100 parts by weight oxidized oil.

5. The method defined in claim 1 wherein elemental sulfur is added to the reaction product for dissolution therein before addition of the neutralizing agent.

6. The method defined in claim 1 wherein elemental sulfur is added to the reaction product for dissolution therein simultaneously with addition of the neutralizing agent.

7. The method defined in claim 1 wherein elemental sulfur is added to the reaction product for dissolution therein after addition of the neutralizing agent.

8. The reaction product prepared by the method defined in claim 1.

9. The reaction product prepared by the method defined in claim 2.

10. The reaction product prepared by the method defined in claim 3.

11. A cutting oil essentially comprising a solution of the reaction product prepared by the method defined in claim 1 in a straw paraffin oil having a viscosity between 75 and 150 SSU at 100° F., the concentration of the reaction product in the solution being a significant amount up to about 25%.

12. A cutting oil essentially comprising a solution of the reaction product prepared by the method defined in claim 2 in a straw paraffin oil having a viscosity between 75 and 150 SSU at 100° F., the concentration of the reaction product in the solution being a significant amount up to about 25%.

13. A cutting oil essentially comprising a solution of the reaction product prepared by the method defined in claim 3 in a straw paraffin oil having a viscosity between 75 and 150 SSU at 100° F., the concentration of the reaction product in the solution being a significant amount up to about 25%.

References Cited in the file of this patent

UNITED STATES PATENTS

| 1,964,983 | Gallsworthy | July 3, 1934 |
| 2,242,174 | Burke et al. | May 13, 1941 |
| 2,249,312 | Kimball | July 15, 1941 |
| 2,303,853 | Lutz et al. | Dec. 1, 1942 |

FOREIGN PATENTS

| 507,385 | Great Britain | June 14, 1949 |

OTHER REFERENCES

Action of Sulfur Monochloride on Petroleum Hydrocarbon, Lorand; Ind. and Eng. Chem., vol. 19, No. 6, June 1927, pp. 733–735.